Aug. 25, 1942.　　　　C. A. TRAPP　　　　2,294,099
PROTECTIVE DEVICE FOR ELECTRICAL CONDENSERS
Filed Oct. 3, 1938　　　7 Sheets-Sheet 1
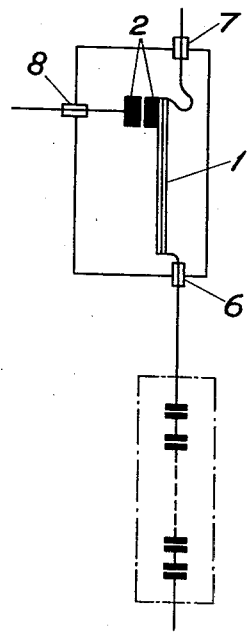
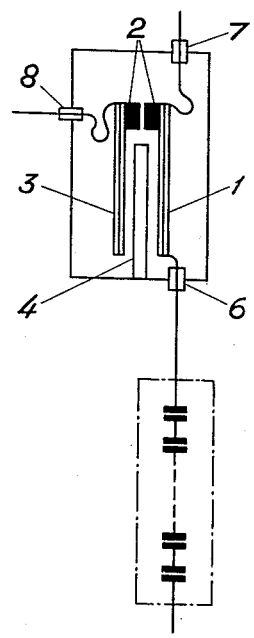
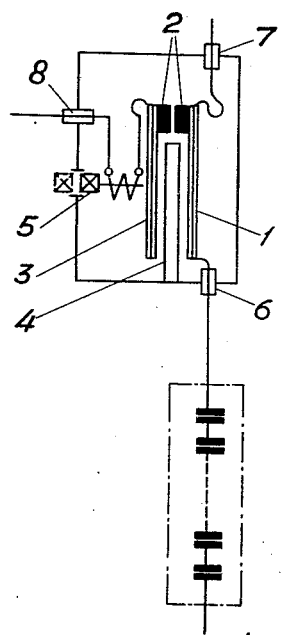
Inventor
Carl Åke Trapp.
per Wm Wallace White
Attorney.

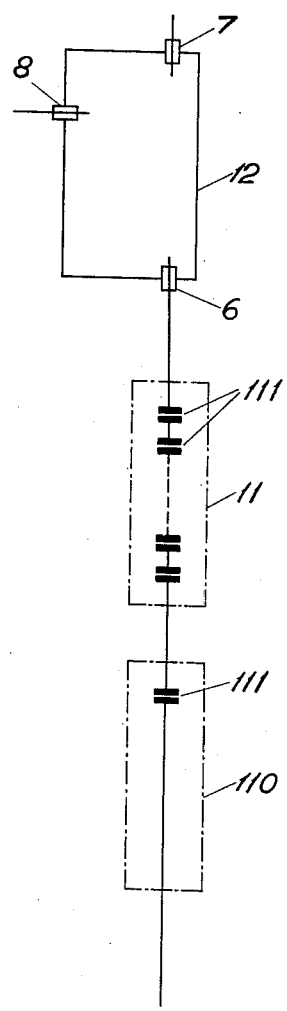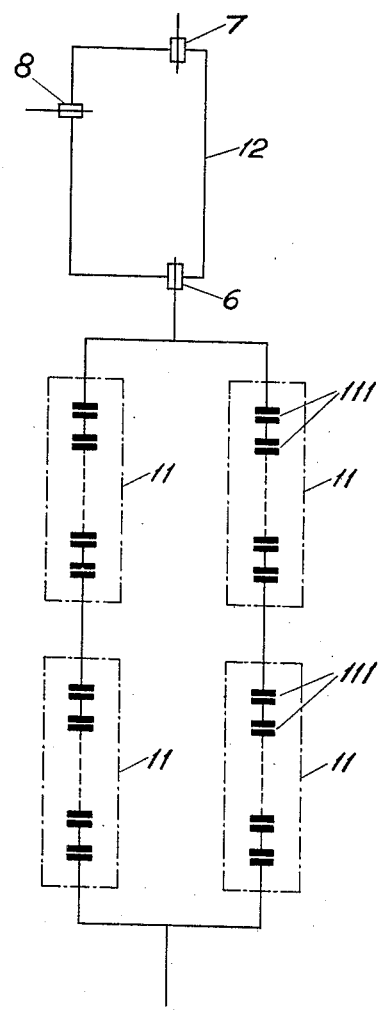

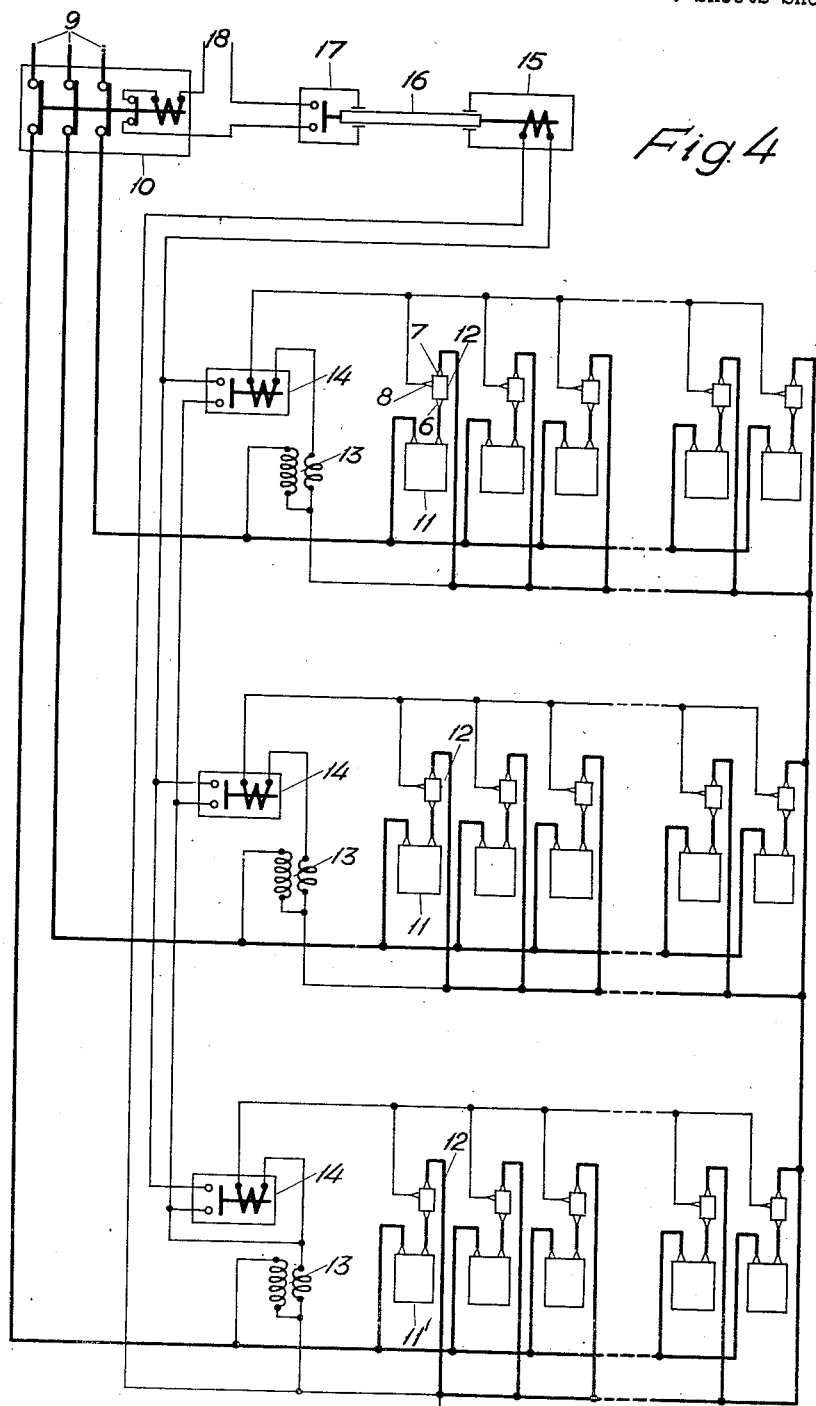

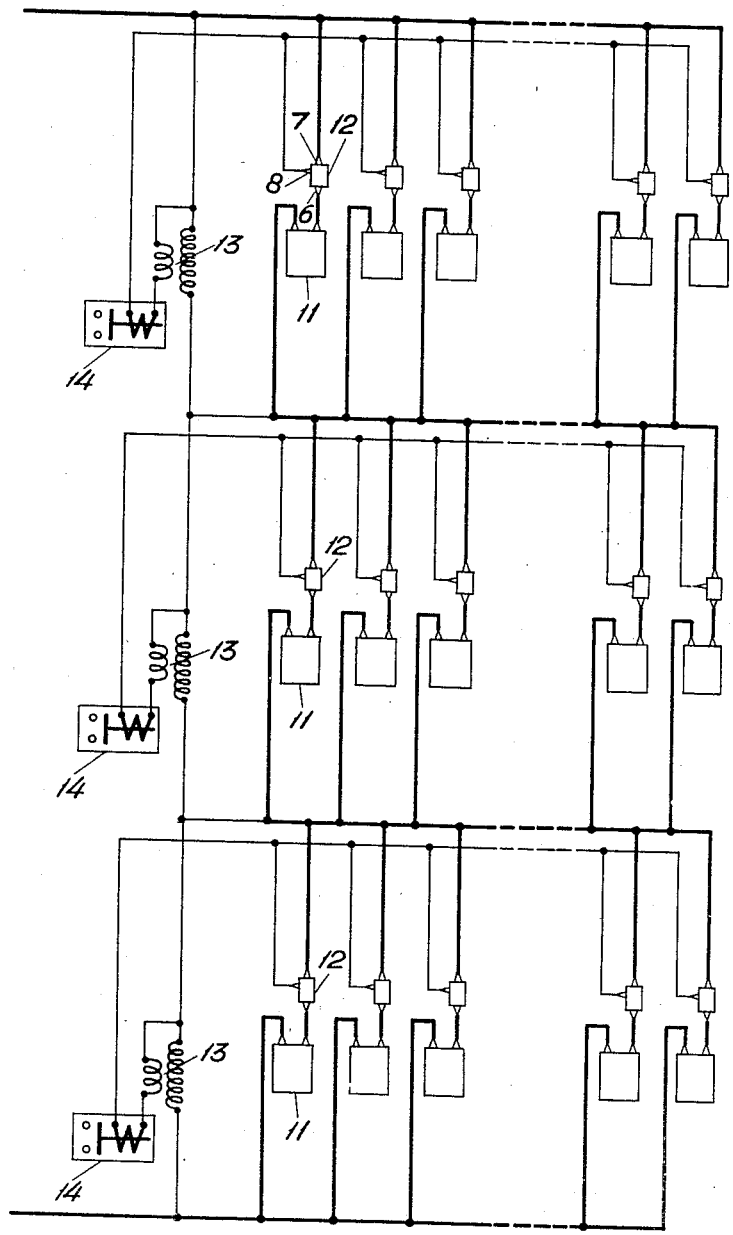

Aug. 25, 1942.   C. A. TRAPP   2,294,099
PROTECTIVE DEVICE FOR ELECTRICAL CONDENSERS
Filed Oct. 3, 1938   7 Sheets-Sheet 7

Inventor
Carl Åke Trapp.
per Wm Wallace White
Attorney.

Patented Aug. 25, 1942

2,294,099

UNITED STATES PATENT OFFICE 2,294,099

PROTECTING DEVICE FOR ELECTRICAL CONDENSERS

Carl Åke Trapp, Stockholm, Sweden, assignor to Allmänna Svenska Elektriska Aktiebolaget, Vasteras, Sweden, a corporation of Sweden Application October 3, 1938, Serial No. 232,963
In Sweden September 22, 1937

4 Claims. (Cl. 175—294)

Protecting devices for electrical condensers, having the purpose to disconnect the condenser from the network on the occurrence of faults, are as a rule designed in accordance with the principles known and used for other apparatus, generally over-current protection, no-volt protection and unbalance protection. These protecting devices are generally suitable and sufficient at low voltages and may be adapted for small as well as for large condenser outputs. In condensers for large voltages which must be built up by partial capacitors for constructional reasons, the problem, however, is not the same. If a breakdown, for instance, occurs in one of the series connected partial capacitors the protection device does not act before the whole chain of partial capacitors or the major part of the same has broken down and the sensitivity of the protection for break-down in one of the series connected partial capacitors will be smaller the more they are in number. If the condenser output is comparatively small so that several parallel units with series connected partial capacitors need not be used, the ordinary protection may still be sufficient at a reasonable number of series connections. Condensers of large outputs are, however, generally built up by a large number of elements, formed by series connected partial capacitors, hence a protection device common for the whole battery cannot without neglecting other advantages be made sufficiently sensitive according to the principles hitherto used. If the battery is divided into several parts each with separate protection devices, the protecting arrangement will be very expensive. If the battery is built in such a manner that individual elements, having no interior series connected partial capacitors are externally series connected, the sensitivity of the protection can certainly be increased, if all elements with the same potential are connected together. This arrangement, however, is followed by another disadvantage, as, if the battery is built of standard elements of a certain output, which is a great advantage from the manufacturing point of view, the steps will be very large in which the total output of the battery can be varied by using standard elements, as the steps of output are determined by the product of the number of phases, the number of series connected elements and the output of each element.

The present invention relates to a protection arrangement for electrical condensers, characterized in that each condenser unit is separately protected by a current feeling relay, for instance a bimetallic plate, and that this relay operates a releasing arrangement common for the whole condenser battery or part thereof. The current feeling relay is designed in such a manner that it is influenced by an increase in current on account of a short-circuit of a part of the series connected partial capacitors of the condenser unit and thus causes release before a total short-circuit of the whole unit has occurred. This means that the risk of ignition of the impregnating fluid is greatly reduced. At ordinary voltages the number of series connected partial condensers may be balanced in such a manner that release occurs at a short-circuit in only one of these condensers without undue releases occurring on account of normally admissible voltage variations. By providing the relays operating for each unit with some delay as in bimetallic plates, no undue releases on account of the current rush at switching in may occur. The relays may also in a simple manner be constructed with an indicating arrangement, showing in which unit the fault has occurred.

A considerably more effective protection is thus obtained with the arrangements according to the invention than with the protections hitherto commonly used for condensers.

The attached drawings illustrate the invention by way of examples.

Fig. 1 shows a thermal relay with bimetallic plate as current feeling relay. In Fig. 2 the bimetallic plate is compensated for the surrounding temperature and in Fig. 3 it is provided with a signal arrangement.

Fig. 4 is a diagram of connections of a three-phase group of individually protected condenser elements.

Fig. 5 shows the arrangement with series connected groups of parallel connected condenser elements.

Figure 6:
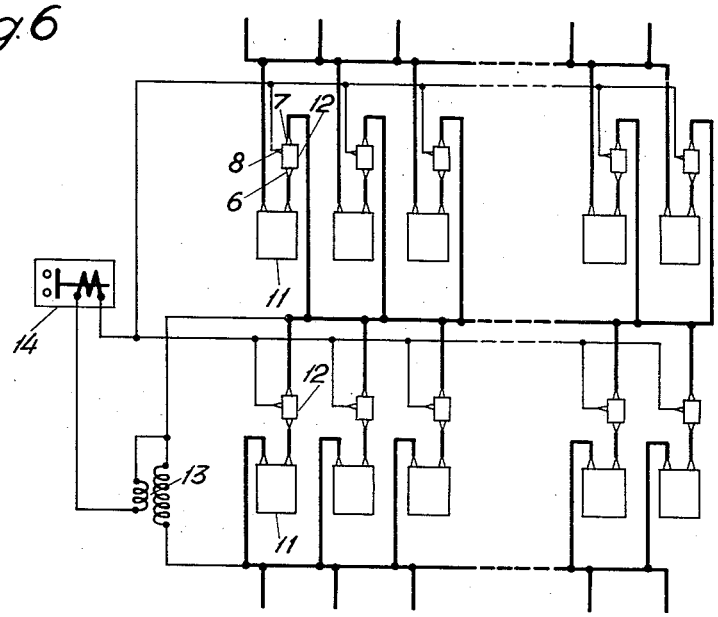
Figs. 6 and 7 show other arrangements of such groups.

In Fig. 1 a current feeling relay is shown connected to a condenser element with series connected partial capacitors where the current feeling member is a thermal relay with a bimetallic plate 1 which closes the contacts 2 at an increase in current. The current feeling relay may be connected to two or several externally series connected condenser elements with or without internally series connected partial capacitors and two or several such condenser chains may be externally parallel connected. Fig. 2 illustrates a compensated relay, known per se. The bimetal 1 affected by the current and the bimetal 3 solely affected by the surrounding temperature are separated by the wall 4. The relay is connected to the condenser current by means of the terminals 6 and 7 and terminal 8 connects a current source and an intermediary relay with the terminal 7. Fig. 3 shows an indicating arrangement 5 which is actuated by current through the circuit 7—8 and indicates if the relay has operated. In Fig. 4 the complete diagram of connections is shown for a three-phase condenser battery with protection according to the invention. 9 is the incoming line, 10 the circuit breaker, 11 the condenser units and 12 the current feeling relays inserted in the neutral connection of the condensers with the terminals 6, 7 and 8. The current feeling relay 12 is suitably mounted directly on the condenser terminal or busbar which it is connected to. From the secondary terminals of the potential transformers 13, the circuit over the terminals 7, 8 is fed, and in this circuit the relays 14 are inserted. One of the transformers 13 is intended also to feed the circuit which is closed by the relays 14 operating the relay 15, the contacts 17 of which are operated by means of the insulating rod 16 and which closes the operating current from 18 through the releasing coil of the circuit breaker 10. 19 is an earthing transformer, the primary winding of which connects the neutral of the system to earth and the secondary winding of which is used for indicating earth currents in a manner known per se.

Figure 7:
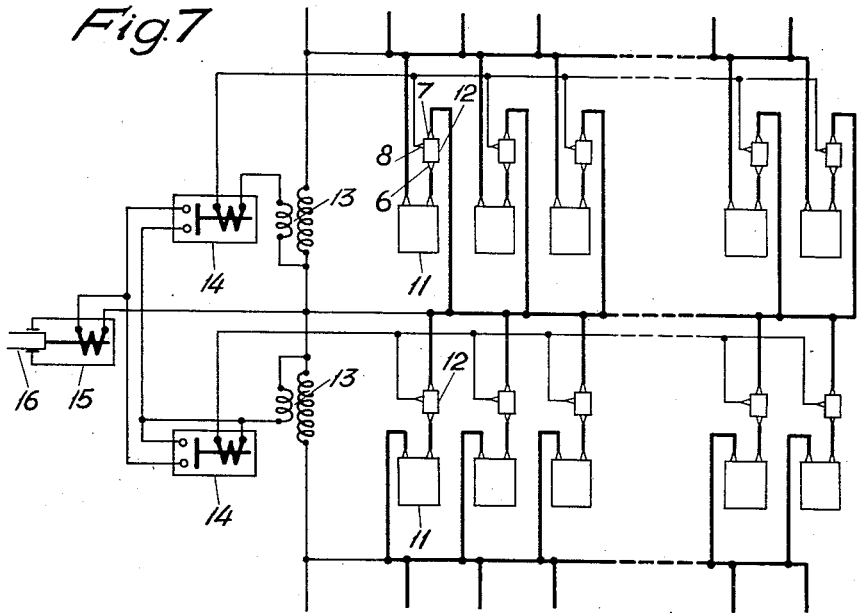
Figure 8:
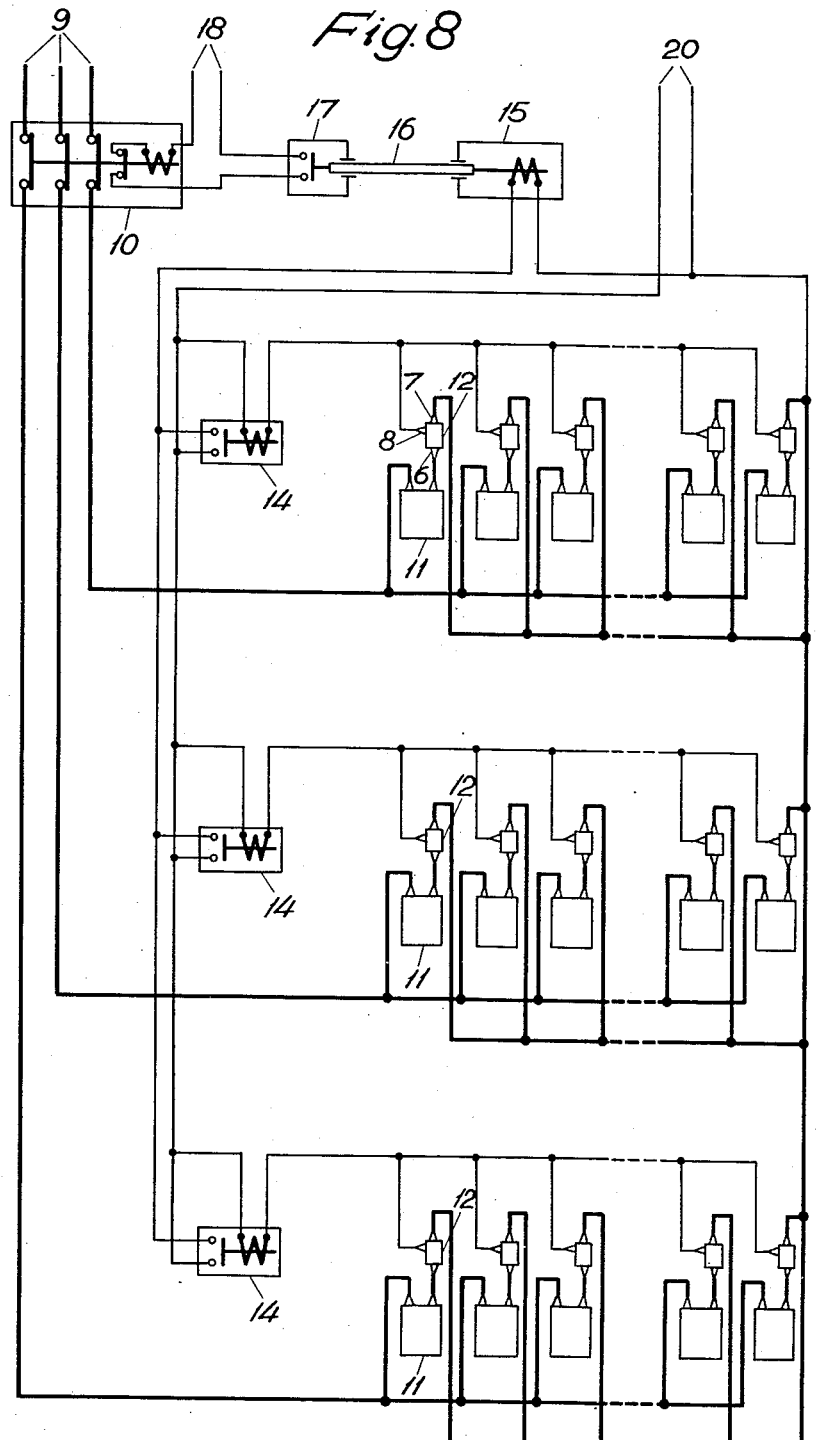
Fig. 8 is a similar diagram as in Fig. 4, but with a separate source of operating current.

Fig. 5 shows a design with series connected groups of parallel connected condenser units, wherein the potential transformers 13 and the relays 14 fed from the secondary terminals of the same are connected over each group, thus at different potential. By mounting the transformer and the relays insulated from earth these apparatus may be made for the same voltage, i. e., the voltage of the group, independent of the voltage to earth of the group to which they belong. The relays 14 are intended to operate each on its own relay constructed according to 15, 16, 17 in Fig. 4 or they may themselves be carried out in this manner. In Figs. 6 and 7 some other connections are shown according to the invention. Here too the relays 14 may be constructed according to 15, 16, 17 in Fig. 4. It appears from Fig. 6 how simple a protection according to the invention may be arranged at for instance two series connected groups of parallel connected condenser units. Fig. 8 shows a complete diagram of connections for a three-phase protection according to the invention with the relays fed from a separate source of current 20. This also is suitably mounted insulated from earth.

Figure 9:
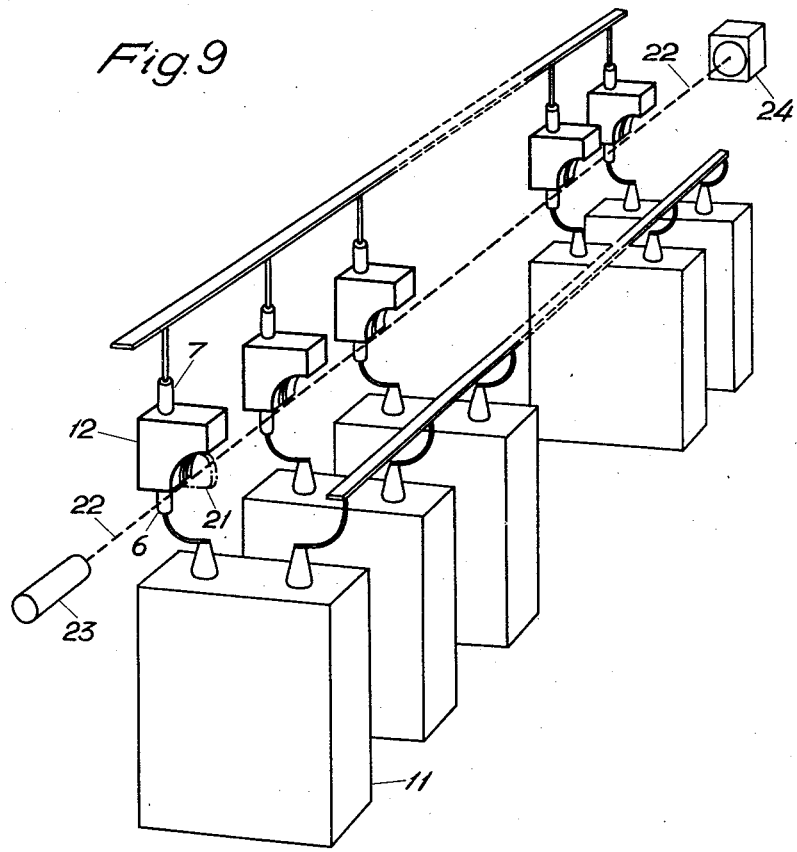
Figs. 9, 10 and 11 show a current feeling relay cooperating with photo-electric cells.
Figure 10:
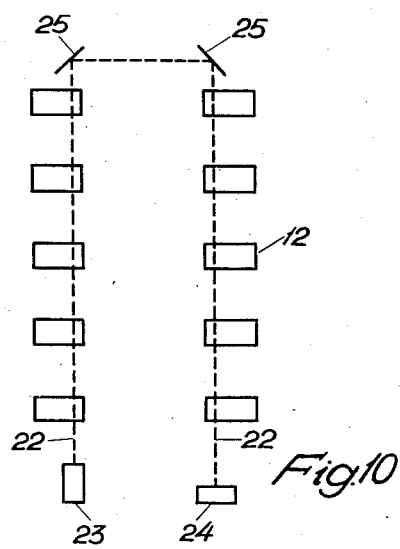
Figure 11:
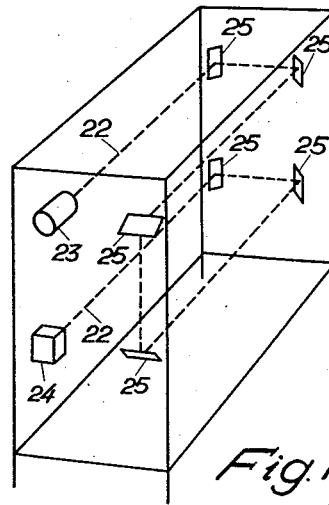

Fig. 9 shows an arrangement according to the invention where a beam of visible or invisible light 22 from the lighting source 23 and which normally acts upon the photo-electric cell 24 is screened off by means of the screen 21, operated at indication of the current feeling relay 12. In order to reduce the number of lighting sources, optical devices and photo-electric cells, mirrors may be used for deflecting the beams of light in a desired way. In Fig. 10 thus the beam of light passes by deflection in the mirrors 25 two rows of relays with screening mechanisms and in Fig. 11 four rows.

I claim as my invention:

1. A protective device for a battery of electrical condensers with a main switch in the incoming line and a plurality of condenser elements connected to each other in parallel and each consisting of a plurality of series-connected partial capacitors, comprising a current feeling relay for each condenser element, means whereby each of said elements is connected in series to one of said relays so that each such relay will respond to current increase upon a short circuit in a part of the partial capacitors of the condenser element connected thereto independently of the other condenser elements, a circuit under the control of a group of said feeling relays, and a common relay controlled by said circuit to open the main switch and thus disconnect the battery from the incoming line before a total short circuit has occurred in all the partial capacitors of the condenser element containing the fault.

2. A protective device for a battery of electrical condensers according to claim 1, comprising means for connecting the current feeling relay to at least two different potentials in the circuit of the series connected condenser chain.

3. A protective device for a battery of electrical condensers with a main switch in the incoming line and a plurality of condenser elements connected to each other in parallel and each consisting of a plurality of series connected partial capacitors, comprising a current feeling relay for each condenser element, means whereby each of said elements is connected in series to one of said relays so that each such relay will respond to current increase upon a short circuit in at least a part of the partial capacitors of the condenser element connected thereto independently of the other condenser elements, an intermediary relay, means whereby the feeling relay closes a circuit from the condenser terminal to which it is connected and through said intermediary relay back to said condenser terminal, a potential transformer feeding said circuit and having its secondary winding inserted in said circuit and having its primary winding connected between the same condenser terminal and a condenser terminal with other potential in the same phase, and means whereby the feeling relay and the intermediary relay disconnect the battery from the incoming line before a total short circuit has occurred in all the partial capacitors of the condenser element containing the fault.

4. A protective device for a battery of electrical condensers with a main switch in the incoming line and a plurality of condenser elements connected to each other in parallel and each consisting of a plurality of series connected partial capacitors, comprising a current feeling relay for each condenser element, means whereby each of said elements is connected in series to one of said relays so that each such relay will respond to current increase upon a short circuit in at least a part of the partial capacitors of the condenser element connected thereto independently of the other condenser elements, an intermediary relay, means whereby the feeling relay closes a circuit from the condenser terminal to which it is connected and through said intermediary relay back to said condenser terminal, a potential transformer feeding said circuit and having its secondary winding inserted in said circuit and having its primary winding connected to at least a part of the main voltage, and means whereby the feeling relay and intermediary relay thus control the main switch and disconnect the battery from the incoming line before a total short circuit has occured in all the partial capacitors of the condenser element containing the fault.

CARL ÅKE TRAPP.